Oct. 13, 1959 H. SINCLAIR 2,908,367
MECHANICAL COUPLING MEANS
Filed Dec. 7, 1954

INVENTOR
Harold Sinclair
BY
Benjamin Sweedler
ATTORNEY

United States Patent Office 2,908,367
Patented Oct. 13, 1959

2,908,367

MECHANICAL COUPLING MEANS

Harold Sinclair, Windsor, England

Application December 7, 1954, Serial No. 473,647

Claims priority, application Great Britain
December 11, 1953

2 Claims. (Cl. 192—67)

This invention relates to mechanical coupling means of the synchronous self-shifting type. Mechanical coupling means of this type are known which comprise at least one first toothed clutch member, which may be a rotary driving member or a rotary driven member, a second member, which may be a rotary driven member or a rotary driving member, an intermediate toothed member constrained for helical movement on said second member into and out of toothed engagement with said first member, and a subsidiary ratchet drive comprising one or more pawls for effecting said toothed engagement without clashing of the teeth of said first and intermediate members.

Such coupling means operate satisfactorily for low and medium speeds of the part which carries the pawls, but as the angular speed of this part increases the increasing effect of centrifugal force on the pawls creates difficulties. The pawls are normally mounted on pivot pins and their noses are urged to an operative position by control springs. At high speeds, one effect of centrifugal force is to produce high pressure and hence high friction between the pawls and their pivot pins, such that the pawls become inoperative under the light actuating force of the control springs.

At high speed the effect of the control springs is largely overcome by the action of centrifugal force, which may either press the noses of the pawls too firmly against the co-operating teeth of the ratchet drive, if the pawls are slightly nose heavy, causing undue wear of the backs of the pawls which come into contact with the said teeth; or alternatively may maintain the pawls in a retracted position if the tails are slightly heavy when in the raised position with the noses down in the radial sense, in which case the ratchet drive is incapable of operating.

The object of the invention is to overcome these disadvantages, and in accordance with the invention there are provided mechanical coupling means comprising at least one first toothed clutch member, a second member and an intermediate toothed clutch member constrained for helical movement on said second member into and out of toothed engagement with said first member, a subsidiary ratchet drive for effecting said toothed engagement without clashing and adapted to be inoperative at angular speeds of said ratchet drive above a pre-determined angular speed, and further means for effecting said toothed engagement at angular speeds of said ratchet drive at which said ratchet drive is inoperative.

Figure 1:
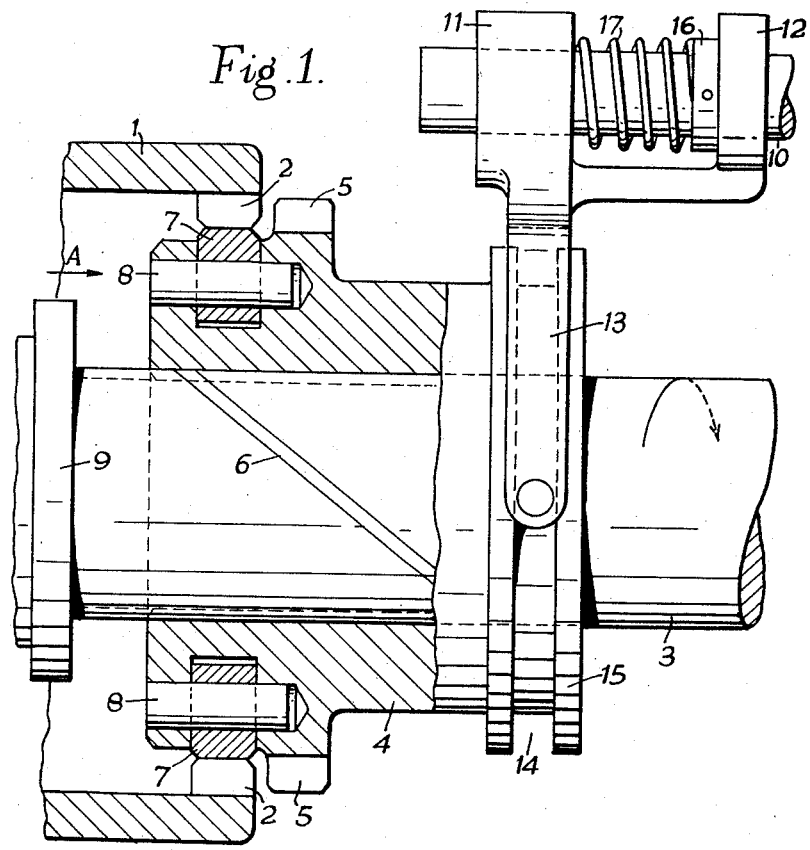
Figure 2:
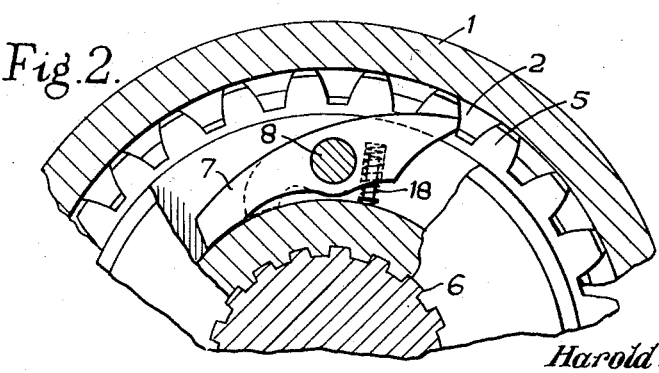

In order that the invention may be clearly understood and readily carried into effect it will now be described in more detail with reference to the accompanying drawing, Figure 1 of which is a longitudinal section of a clutch constructed in accordance with the invention, and Figure 2 is a fragmentary view looking in the direction of the arrow A of Figure 1.

Referring to the drawing, the clutch shown comprises a first rotary member 1 provided with a ring of internal jaw clutch teeth 2, a second rotary member in the form of a shaft 3, and an intermediate member 4, provided with a ring of external jaw clutch teeth 5. The intermediate member 4 is formed with internal helical splines of steep pitch that co-operate with helical splines 6 on the shaft 3, whereby the intermediate member 4 is constrained to move helically on the shaft 3. The intermediate member is provided with a ring of pawls 7 mounted on pins 8, the noses of the pawls 7 being directed in clockwise sense, looking at the mechanism from the left-hand side in the drawing. The clutch is shown in the dis-engaged condition, viz:—with the teeth 5 to the right of the teeth 2 and with the pawls 7 within the ring of teeth 2. In accordance with normal practice the pawls are provided with springs 18 which tend to urge the noses of the pawls radially outwards.

The clutch as so far described is of conventional form. Assuming that the shaft 3 is turning in the direction of the arrow, faster than the member 1, the pawls 7 ratchet past the internal teeth 2. If the member 1 now tends to overrun the shaft 3, a pawl 7 is picked up by a tooth 2 and the intermediate member 4 is thereby caused to move helically to the left along shaft 3 so as to bring its teeth 5 smoothly into clutch engagement with the teeth 2, the movement of the intermediate member to the left being limited by an axial stop 9. When the shaft 3 again overruns the member 1 the torque transmitted via the teeth 2 and 5 causes the intermediate member 4 to be shifted helically to the right so as to bring the teeth 5 out of engagement with the teeth 2 and to bring the pawls 7 back into ratchetting engagement with the teeth 2.

In accordance with the present invention, the pawls 7 are made tail heavy so that at a pre-determined angular speed of shaft 3, centrifugal force causes the tails of the pawls 7 to move radially outwards so as to bring the noses of the pawls radially inwards so that they are incapable of ratchetting engagement, and auxiliary means are provided which are capable of initiating clutch engagement when the pawls 7 are inoperative. In Fig. 2 the tail heavy pawl 7 is shown in full lines; the broken lines indicate the shape of a conventional pawl. The said auxiliary means comprise a selector rod 10 which projects through guides 11 and 12 on a control fork 13 that engages a groove 14 in an annular flange 15 formed on the intermediate member 4. The rod 10 has a collar 16 fixed on it and between the collar 16 and the guide 11 a helical compression spring 17 is provided on the rod 10.

Assuming that the shaft 3 is rotating at or above the said pre-determined speed, and that the clutch is disengaged, at a convenient time before it is required to bring the clutch into a condition such as will cause engagement to take place at near synchronism the rod 10 is moved to the left. This will result in the teeth 5 coming into nuzzling engagement with the teeth 2, and further movement of the rod 10 to the left will compress the light spring 17. When the member 1 is accelerated and attains near synchronism with the shaft 3, the teeth 5 on the intermediate member 4 will come into partial engagement with the tooth spaces between the teeth 2 on the member 1 and the intermediate member 4 will be drawn along the helical splines 6 into clutching engagement with the member 1.

If the member 1 is retarded relative to shaft 3, the intermediate member 4 will move to the right along the helical splines 6, disengaging the clutch teeth 5, the end faces of which will remain in nuzzling contact with the teeth 2 until the member 1 is accelerated or the shaft 3 is retarded to bring the member 1 and shaft 3 into near synchronism such as will cause the clutch to re-engage.

When the clutch is not required to be operative above the pre-determined speed the rod 10 may be moved to the right so as to permit the intermediate member 4 to disengage from nuzzling contact of the teeth 5 with the teeth 2 on the member 1, when shaft 3 overruns member 1.

The rod 10 may be actuated by hand, or by speed responsive means. In the latter case the rod 10 may be arranged to be moved to the left when the angular speed of shaft 3 is slightly below the angular speed at which the pawls 7 become inoperative. For example, the pawls 7 may be arranged to be operative over a range of speeds of shaft 3 of say 0 to 250 r.p.m. and the rod 10 may be arranged to be moved to the left at an angular speed of shaft 3 of 150 r.p.m. Alternatively the rod 10 may be set in the left-hand position during all times when the clutch is likely to be required to operate as a synchronous self-shifting clutch mechanism.

I claim:

1. Mechanical clutch means comprising a first toothed rotary member provided with a ring of internal clutch teeth, a second rotary member, a toothed intermediate member provided with a ring of external clutch teeth and constrained for helical movement on said second member into and out of toothed engagement with said first member, at least one pawl carried by one of said first and intermediate members and ratchet teeth carried by the other of said first clutch and intermediate members, said pawl being provided with a spring that tends to urge the nose of the pawl into a ratchetting position in relation to said ratchet teeth and the weight distribution of the pawl being such that above a predetermined angular speed of said pawl carrying member the nose of the pawl is urged into a position in which it is incapable of cooperating with the teeth on said other member, and means operable to urge said intermediate member in a direction from a disengaged to an engaged position with respect to said first clutch member when said pawl carrying member is moving at an angular speed above said predetermined angular speed.

2. Mechanical clutch means comprising a first toothed rotary clutch member provided with a ring of internal clutch teeth, a second rotary clutch member, a toothed intermediate member provided with a ring of external clutch teeth and constrained for helical movement on said second member into and out of toothed engagement with said first member, at least one pawl mounted on a pawl pin carried by said intermediate member, said pawl having a nose portion and a tail portion, the pawl being provided with a spring that tends to urge the nose of the pawl radially outwards to a position in which it is capable of cooperating with said internal clutch teeth to effect synchronous engagement of said first and second members and said pawl being tail heavy whereby above a predetermined angular speed of said intermediate member the nose of the pawl is urged radially inwards by centrifugal force, so as to be incapable of cooperating with said internal clutch teeth, and means operable to urge said intermediate member in a direction from a disengaged to an engaged position with respect to said first rotary member when said intermediate member is moving above said predetermined angular speed.

References Cited in the file of this patent

UNITED STATES PATENTS

| | | |
|---|---|---|
| 2,204,750 | Conover | June 18, 1940 |
| 2,224,322 | Sinclair | Dec. 10, 1940 |
| 2,245,017 | Sinclair | June 10, 1941 |
| 2,304,375 | Peterson et al. | Dec. 8, 1942 |
| 2,433,428 | Carnagua et al. | Dec. 30, 1947 |
| 2,657,585 | Williams et al. | Nov. 3, 1953 |